United States Patent
Currivan et al.

(10) Patent No.: US 7,978,795 B2
(45) Date of Patent: Jul. 12, 2011

(54) FAST AUTOMATIC GAIN CONTROL

(75) Inventors: Bruce Currivan, Dove Canyon, CA (US); Loke Tan, Newport Coast, CA (US); Thomas Kolze, Phoenix, AZ (US)

(73) Assignee: Broadcom Corporation, Irvine, CA (US)

( * ) Notice: Subject to any disclaimer, the term of this patent is extended or adjusted under 35 U.S.C. 154(b) by 676 days.

(21) Appl. No.: 11/945,288

(22) Filed: Nov. 27, 2007

(65) Prior Publication Data
US 2009/0135896 A1    May 28, 2009

(51) Int. Cl.
*H04L 27/08* (2006.01)
(52) U.S. Cl. ........................................ 375/345
(58) Field of Classification Search ............ 375/345
See application file for complete search history.

(56) References Cited

U.S. PATENT DOCUMENTS

| | | | |
|---|---|---|---|
| 6,987,821 B1* | 1/2006 | Li | 375/345 |
| 7,580,482 B2* | 8/2009 | Endres et al. | 375/326 |
| 7,746,969 B2* | 6/2010 | Bryan et al. | 375/349 |
| 2006/0120491 A1* | 6/2006 | Yen et al. | 375/345 |
| 2007/0286315 A1* | 12/2007 | Hong et al. | 375/345 |
| 2009/0067556 A1* | 3/2009 | Grayver et al. | 375/345 |

* cited by examiner

*Primary Examiner* — Kevin Y Kim
(74) *Attorney, Agent, or Firm* — Sterne, Kessler, Goldstein & Fox P.L.L.C.

(57) ABSTRACT

An apparatus comprising a slicer configured to produce a symbol decision value and a symbol error value utilizing, at least in part, a slicer input signal; and an automatic gain controller configured to facilitate the automatic control of a gain applied to the slicer input signal by producing a gain control signal, the automatic gain controller comprising a decision-directed amplitude error detector configured to utilize, at least in part, the symbol decision value and the symbol error value to produce an amplitude error signal, and a loop filter configured to utilize the amplitude error signal to produce the gain control signal.

20 Claims, 5 Drawing Sheets

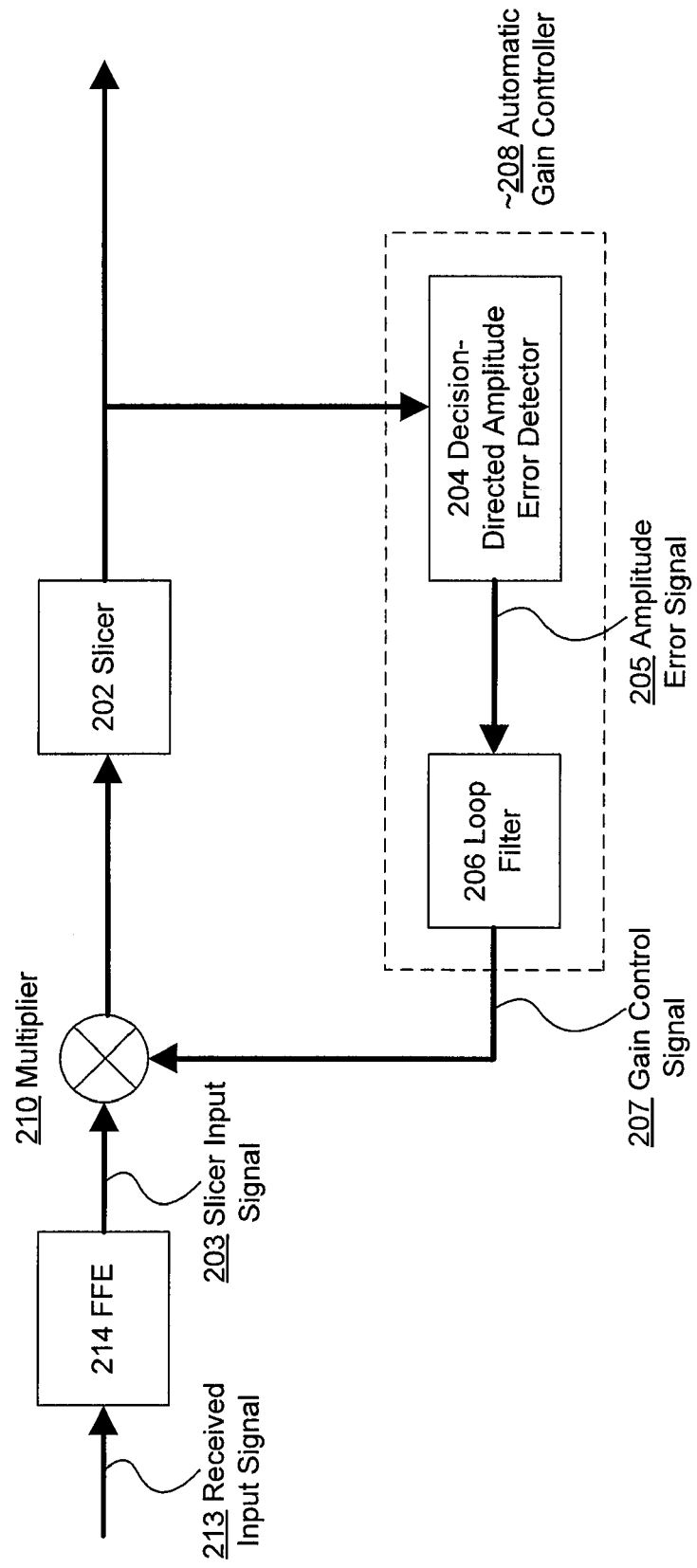

300

400

FAST AUTOMATIC GAIN CONTROL

TECHNICAL FIELD

This description generally relates to the gain control of a signal, and more specifically to the automatic gain control of the signal utilizing a decision directed technique.

BACKGROUND

Typically an adaptive equalizer may be used to filter and alter a signal. In some instances such an equalizer may be used to mitigate the effects of, for example, multipath propagation and/or Doppler spreading, although many other reasons to use an adaptive equalizer exist. Often an adaptive equalizer is a time variant system, meaning, in this context, that the characteristics of the system change, or are capable of changing, with time. Some examples of such adaptive equalizers may use feedback of detected symbols in addition to conventional equalization of future symbols.

Often an unwanted signal may become coupled with a desired communication signal. For example, in one embodiment, the signal powering a device may become coupled with a received communication signal. Typically the alternating-current (AC) power derived from a power outlet fluctuates at a rate of 50-60 Hz. This 50-60 Hz fluctuation may become superimposed upon a communication signal operating at a different frequency, for example, 1 GHz. A low frequency noise signal may be colloquially referred to as "hum." In a typical case, the interfering AC signal may cause an amplitude modulation (AM) of the desired communication signal. The amplitude modulation may include the 50-60 Hz AC frequency and/or its harmonics.

SUMMARY

A system and/or method for communicating information, substantially as shown in and/or described in connection with at least one of the figures, as set forth more completely in the claims.

BRIEF DESCRIPTION OF THE DRAWINGS

FIG. 2a is a block diagram of an embodiment of an apparatus to perform gain control of a signal in accordance with the disclosed subject matter.

DETAILED DESCRIPTION

Figure 1:
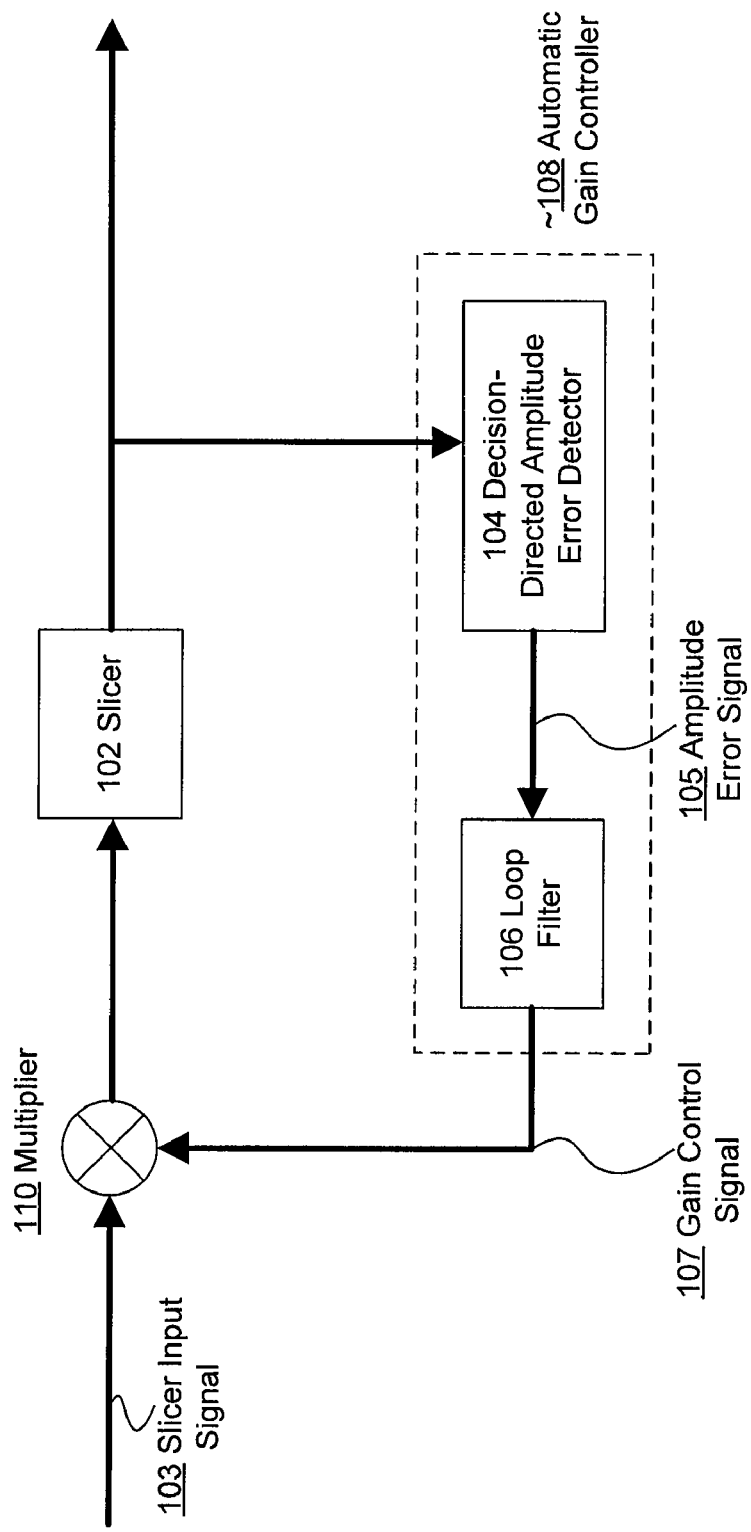
FIG. 1 is a block diagram of an embodiment of an apparatus to perform gain control of a signal in accordance with the disclosed subject matter.

FIG. 1 is a block diagram of an embodiment of an apparatus 100 to perform gain control of a signal in accordance with the disclosed subject matter. In one embodiment, the apparatus 100 may include an adaptive equalizer. In one embodiment, the apparatus 100 may include a slicer 102 and an automatic gain controller (AGC) 108. In one embodiment, the automatic gain controller 108 may include a decision-directed amplitude error detector 104 and a loop filter 106.

In one embodiment, the slicer 102 may by configured to produce a symbol decision value and a symbol error value utilizing, at least in part, a slicer input signal 103. In one embodiment, the slicer 102 may include a first component configured to produce a symbol decision value and a second component configured to produce the symbol error value. In various embodiments, these two components may be integrated, separated or a combination thereof. In one embodiment, the slicer input signal 103 may have undergone various alterations and/or filtering before being input to the slicer 102. In one embodiment, the slicer input signal 103 may be a digital communications signal. In one embodiment, the slicer input signal 103 may include a data portion and a noise portion. In one embodiment, the slicer 102 may be configured to attempt to separate those two portions into a symbol decision value and a symbol error value. In one embodiment, the slicer 102 may output these symbol values as one or more signals.

In one specific embodiment, the slicer input signal 103 may utilize a form of communication known as binary phase-shift keying (BPSK), an extremely simple form of Quadrature Amplitude Modulation (2-QAM), although it is understood that other communication techniques are within the scope of the disclosed subject matter and this is merely one illustrative example. In such an embodiment, a perfect input signal may contain only two values, e.g., −1.0 and 1.0, or a two point constellation of values. However, in one embodiment, the slicer input signal 103 may include a noise portion and, therefore, the slicer input signal 103 may include a symbol (or data point) having a value that is not either of the two desired ideal values, e.g., 0.4. The slicer 102, in one embodiment, may attempt to separate or "slice" the actual received signal into noise portion (the symbol error value) and a data portion (the symbol decision value). In one embodiment, the slicer 102 may determine that the received symbol value of 0.4 is closer to the perfect symbol value of 1.0; therefore, the symbol decision value may be 1.0. As such, the received symbol value of 0.4 is 0.6 from the perfect value of 1.0; therefore, the symbol error value may be 0.6. Once again, it is understood that this is merely one illustrative example embodiment and that other communication techniques are within the scope of the disclosed subject matter, such as for example, non-binary phase-shift keying (PSK) such as 64 PSK, quadrature amplitude modulation (QAM), or techniques involving an in-phase and quadrature phase components (in which case the symbol decision value and symbol error value may include both in-phase and quadrature phase components).

In one embodiment, the apparatus 100 may include an automatic gain controller 108 configured to facilitate the automatic control of a gain applied to the slicer input signal 103 by producing a gain control signal 107. In one embodiment, the gain applied to the slicer input signal 103 may occur utilizing a multiplier 110. In one embodiment, the apparatus 100 may include a multiplier 110 to multiply a pre-multiplied signal with the gain control signal 107 to produce a multiplied signal. In one embodiment, the pre-multiplied signal may include the slicer input signal 103. In one embodiment, the multiplied signal may be input into the slicer 102. As such, in one embodiment, the multiplier 110 may be configured to apply a gain to the slicer input signal 103. It is understood that, in various embodiments, other intervening elements may modify the slicer input signal 103 before it is input to the slicer 102.

In one embodiment, the automatic gain controller 108 may be employed to attempt to correct incorrect symbol decision values caused by excessive gain (positive or negative) applied to a communication signal due to amplitude noise. The above BPSK example was merely a 1-dimentional constellation system. In addition to the 1-diementional example above, some multi-dimensional constellation systems may exist in which noise may cause an incorrect symbol decision value. For example, in an embodiment, perfect or ideal symbols may be arranged on a 2-dimential x/y grid. Valid ideal symbols may be [−2,0], [−1,0], [0,−1], [0,1], [1,0], and [2,0] (to use an arbitrary non-limiting constellation system). In this example, excessive amplitude noise may cause a transmitted symbol [1,0] to be received as [1.7, 0], and therefore mistakenly treated as the symbol [2,0] with a symbol error value of [−0.3,0]. Conversely, phase noise may result in phase error, in this case pushing the symbol a certain angle off of the x-axis, e.g., a received symbol of [0.87, 0.5]. However, this is merely one illustrative non-limiting example of the disclosed subject matter. In one embodiment, the automatic gain controller 108 may attempt to correct or compensate for the amplitude noise.

In one embodiment, the noise may be an amplitude-modulated "hum" caused by the device or system which receives the received communication signal or a transmitting device. In one embodiment, such a "hum" modulation may have a quasi-sinusoidal shape, often having flattening or saturation of the peaks of the "hum." In one embodiment, the automatic gain controller 108 may be configured to track and attempt to correct noise within a specific frequency range, such as, for example the 0 Hz to 300 Hz range or 30 Hz to 1 kHz range. In one embodiment, noise may be corrected utilizing both an amplitude noise tracking system (e.g., automatic gain controller 108) and a phase noise tracking system. In one embodiment, the phase noise tracking system (not shown) may include, but is not limited to, a phase error detector, a de-rotator loop filter, a de-rotator, and/or an error rotator. In various embodiments, these two systems may be separate, integrated, or a combination thereof.

In one embodiment, the automatic gain controller 108 may include a decision-directed amplitude error detector 104 and a loop filter 106. In one embodiment, the decision-directed amplitude error detector 104 may be configured to utilize, at least in part, the symbol decision value and the symbol error value to produce an amplitude error signal 105. In one embodiment, the decision-directed amplitude error detector 104 may be configured to compute a dot product of the symbol decision value and the symbol error value and utilize, at least in part, the dot product to produce the amplitude error signal 105. In one embodiment, the amplitude error signal 105 may be the dot product of a complex signal (e.g., a signal that includes in-phase and quadrature phase components) of the symbol decision value and the symbol error value. In one embodiment, such an implementation of the amplitude error signal 105 may provide a component of the complex signal's symbol error value that is radially directed in the same direction as the constellation point selected by the symbol decision value. This creation of the amplitude error signal 105 is contrasted with a phase error detector (not shown) which may compute a phase error signal, utilizing the cross product of the symbol decision value and the symbol error value, which may produce a component of the complex signal's symbol error value that is angularly directed. Therefore, in one embodiment, the amplitude error signal 105 may be used to correct an error in the gain of the slicer input signal 103. In one embodiment, an error in the gain may cause a directional perturbation of each received symbol outward or inward from its ideal or perfect constellation point location.

In one embodiment, the decision-directed amplitude error detector 104 may be configured to normalize the amplitude error signal 105. In one embodiment, the normalization may include producing the dot product of the symbol decision value and the symbol error value and dividing the result by the squared magnitude of the symbol decision value. In one embodiment, a value of one may be added to the result, or in another embodiment, the loop filter 106 may be configured to adjust for this value. In one embodiment involving the reduction or correction of gain due to "hum," if the "hum" is sufficiently slow moving (relative to the desired communications signal) and/or comparatively small (e.g., 10% of the total gain), the normalization may not be used. Although it is understood that other reasons to use or not use normalization exist and are within the scope of the disclosed subject matter. In one embodiment, the sign of the symbol decision value and/or the sign of the symbol error value (e.g., positive or negative) may be used instead of the symbol decision value or symbol error value, respectively, itself. In one embodiment, such a sign may only occupy one bit for the real component and one bit for the imaginary component of the complex value, and may therefore, in one embodiment, reduce the intricacy of the implementation of the dot product.

In one embodiment, the automatic gain controller 108 may include a loop filter 106. In one embodiment, the loop filter 106 may be configured to utilize the amplitude error signal 105 to produce the gain control signal 107. In one embodiment, the loop filter 106 may adjust the gain applied to the input signal by simply increasing or decreasing the amount of gain. An analogy might be to a situation involving a car in which a driver is merely told "go faster" or "go slower." The loop filter 106 may adjust the gain a predetermined amount but may need to be told repeatedly to increase/decrease the gain that predetermined amount until the correct gain is reached. Furthermore, in one embodiment, the loop filter 106 may over-correct the gain, and need to readjust.

In another embodiment, the loop filter 106 may adjust the gain applied to the input signal by a variable amount. An analogy might be to a situation involving a car in which the driver is told "go 5 miles/hour faster," "go 10 miles/hour slower," or "decelerate by 1 mile/hour per second" for example. In one embodiment, the amplitude error signal 105 may provide the loop filter 106 with the information necessary to determine the variable amount by which to adjust the gain. In such an embodiment, the gain adjustment may occur relatively quickly, as compared to the previous embodiment, because the required gain adjust may occur in fewer (e.g., a single) steps.

Figure 2B:
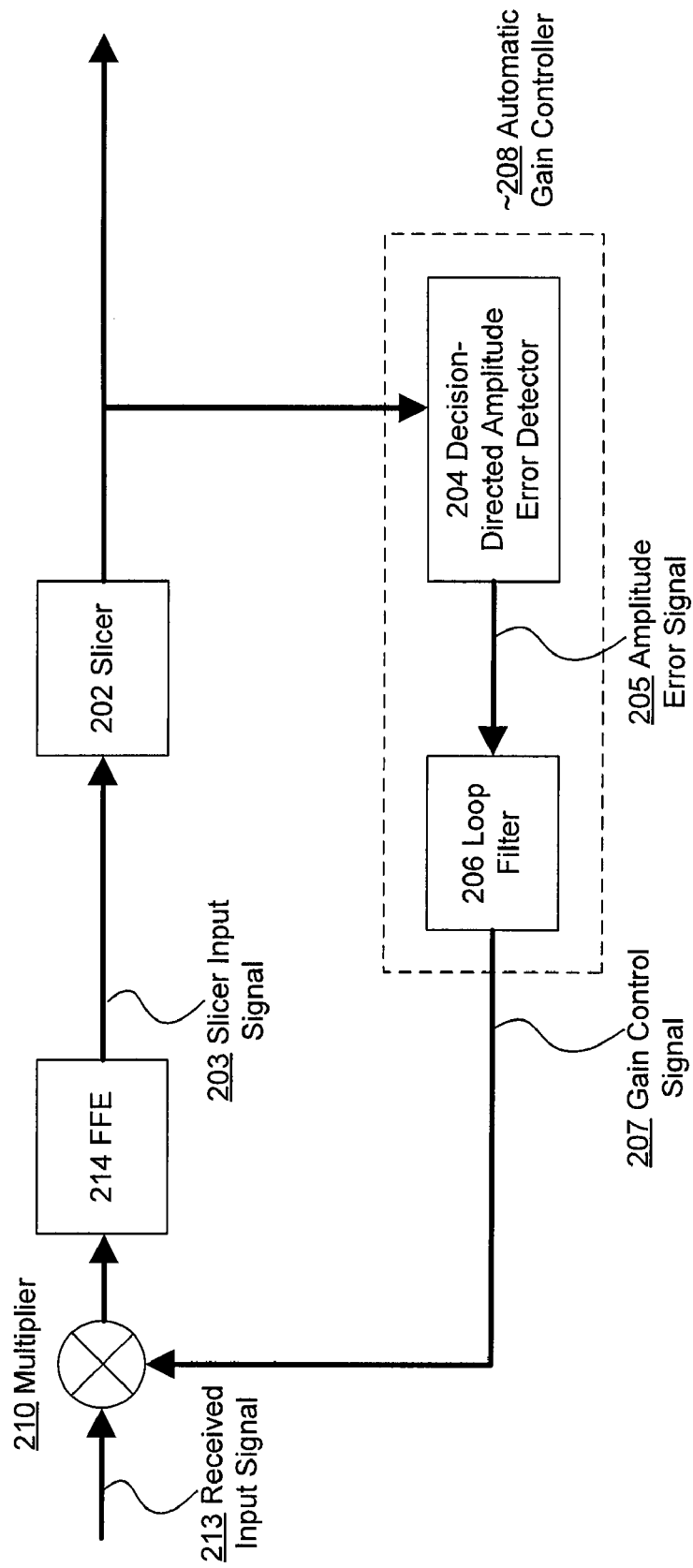
FIG. 2b is a block diagram of an embodiment of an apparatus to perform gain control of a signal in accordance with the disclosed subject matter.

FIGS. 2a & 2b are block diagrams of an embodiment of an apparatus 200 for performing gain control of a signal in accordance with the disclosed subject matter. In one embodiment, the apparatus 200 may include a feed-forward equalizer (FFE) 214, a slicer 202, and an automatic gain controller 208. In one embodiment, the apparatus may also include a multiplier 210.

In one embodiment, the slicer 202 may perform functions and be configured similarly to the slicer 102 of FIG. 1 described above. In one embodiment, the automatic gain controller 208 may perform functions and be configured similarly to the automatic gain controller 108 of FIG. 1 described above. In one embodiment, the automatic gain controller 208 may include a decision-directed amplitude error detector 204 which produces an amplitude error signal 205 and loop filter 206 which produces a gain control signal 207. In one embodiment, the decision-directed amplitude error detector 204, amplitude error signal 205, loop filter 206, and gain control signal 207 may perform functions and be configured similarly to the decision-directed amplitude error detector 104, amplitude error signal 105, loop filter 106, and gain control signal 107, respectively, of FIG. 1 described above. However, it is understood that differing embodiments may include elements that function differently from those described above and still be within the scope of the disclosed subject matter.

In one embodiment, the apparatus 200 may include a feed-forward equalizer (FFE) 214 configured to filter a received input signal 213, and provide a filtered input signal provided to the slicer 202 as a part of the slicer input signal 203. In the embodiment illustrated in FIG. 2a, the filtered input signal is shown as and is equivalent to the slicer input signal 203, although it is understood that, in various embodiments, intervening elements may separate the filtered input signal from the slicer input signal. As such, in various embodiments, the slicer input signal 203 may only include part of or be derived from the filtered input signal.

In the embodiment illustrated by FIG. 2a, the multiplier 210 may be placed in between the feed-forward equalizer (FFE) 214 and the slicer 202. In such an embodiment, the delay within the automatic gain controller 208 loop may be reduced, relative to some other options. The automatic gain controller 208 loop may include the path from the automatic gain controller 208 to the multiplier 210 to the slicer 202 and back to the automatic gain controller 208. In one embodiment, the automatic gain controller 208 loop may also include various intervening elements. In one embodiment, each additional intervening element may increase the delay in the feedback loop. In one embodiment, such a delay may be a disadvantageous for the case of a feed-forward equalizer (FFE) 214 that uses a large number of stored symbols. In various embodiments it may be generally desirable to reduce the number of delays in a feedback loop, as it permits the loop to operate at a higher bandwidth and/or with greater stability.

In the embodiment illustrated by FIG. 2b, the multiplier 210 may be placed in front of the feed-forward equalizer (FFE) 214. In such an embodiment, the delay within the automatic gain controller 208 loop may be increased, relative to some other options. Such a delay may not be a significant disadvantage for, in one embodiment, a feed-forward equalizer (FFE) 214 that uses a small number of stored symbols. However, in one embodiment, placing the multiplier 210 in front of the feed-forward equalizer (FFE) 214 may eliminate or reduce the "hum" or other amplitude based noise form the received input signal 213 before the signal enters the adaptive equalizer 201 structure. Therefore, in one embodiment, a more traditional equalizer structure may be used without alteration of the traditional equalizer structure or with a less alteration than shown in FIG. 2a.

Figure 3:
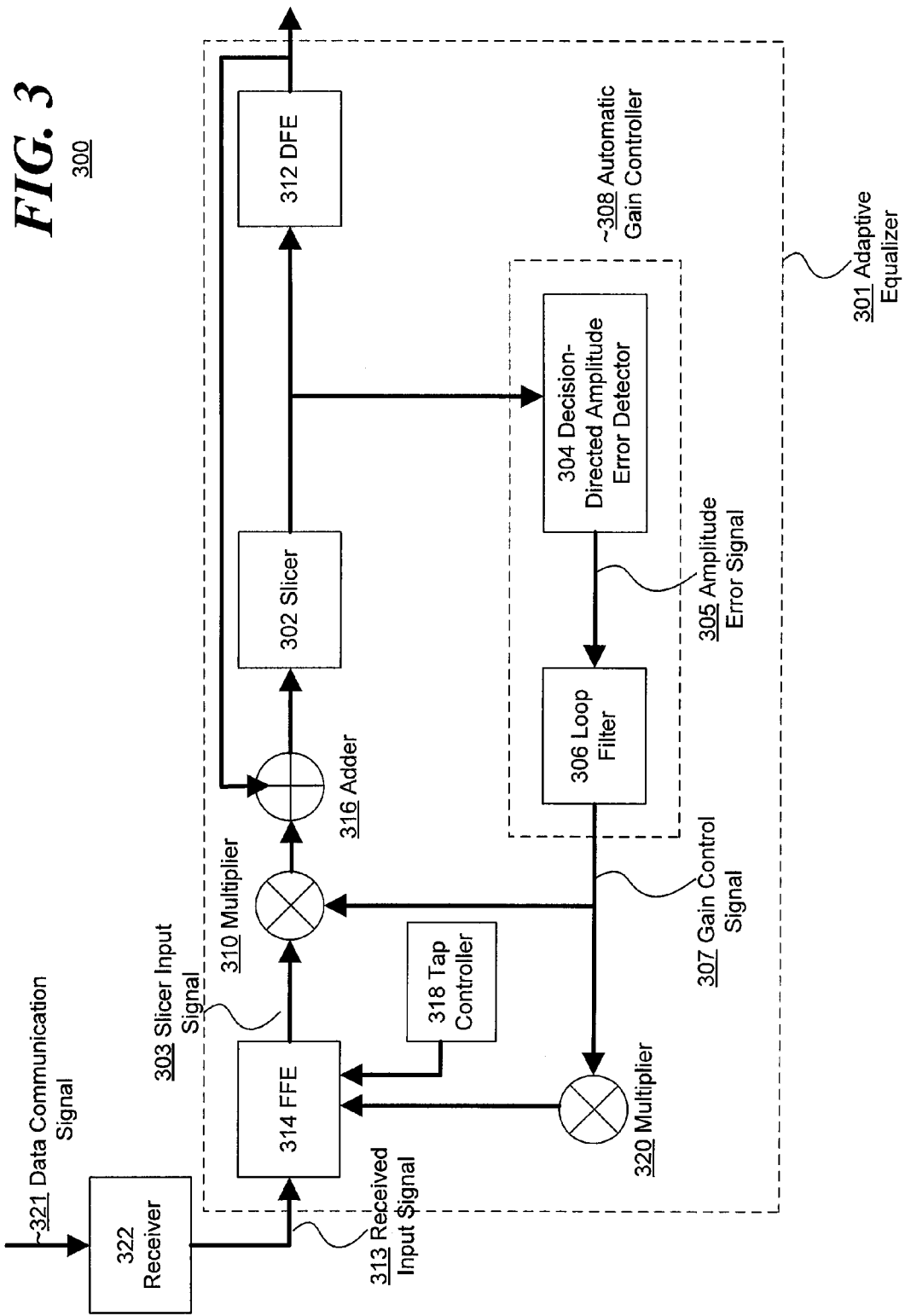
FIG. 3 is a block diagram of an embodiment of a system to perform gain control of a signal in accordance with the disclosed subject matter.

FIG. 3 is a block diagram of an embodiment of a system 300 for performing gain control of a signal in accordance with the disclosed subject matter. In one embodiment, the system 300 may include a receiver 322 and an adaptive equalizer 301. In one embodiment, the adaptive equalizer 301 may include a slicer 302 and an automatic gain controller 308.

In one embodiment, the slicer 302 may perform functions and be configured similarly to the slicer 102 of FIG. 1 described above. In one embodiment, the automatic gain controller 308 may perform functions and be configured similarly to the automatic gain controller 108 of FIG. 1 described above. In one embodiment, the automatic gain controller 308 may include a decision-directed amplitude error detector 304 which produces an amplitude error signal 305 and loop filter 306 which produces a gain control signal 307. In one embodiment, the decision-directed amplitude error detector 304, amplitude error signal 305, loop filter 306, and gain control signal 307 may perform functions and be configured similarly to the decision-directed amplitude error detector 104, amplitude error signal 105, loop filter 106, and gain control signal 107, respectively, of FIG. 1 described above. However, it is understood that differing embodiments may include elements that function differently from those described above and still be within the scope of the disclosed subject matter.

In one embodiment, the adaptive equalizer 301 may include a feed-forward equalizer (FFE) 314 configured to filter a received input signal 313, and provide a filtered input signal provided to the slicer 302 as a part of the slicer input signal 303. In one embodiment, the feed-forward equalizer (FFE) 314 may perform functions and be configured similarly to the feed-forward equalizer (FFE) 214 of FIG. 2 described above. In one embodiment, the feed-forward equalizer (FFE) 314 may include a plurality of values, colloquially known as "taps", which may be adjusted to alter the filtering performed on the received input signal 313. In one embodiment, these taps may vary as a function of time or, in one embodiment, may be set to substantially predetermined values. In one embodiment, the feed-forward equalizer (FFE) 314 may include a gain tap or taps that is configured to control the gain applied to the received input signal 313.

In one embodiment, the adaptive equalizer 301 may include a tap controller 318 configured to control some or all of the taps of the feed-forward equalizer (FFE) 314. In one embodiment, the tap controller 318 may be configured to hold the value of the gain tap(s) substantially constant. In one embodiment, the tap controller 318 may set the gain tap to a complex constant that includes an in-phase and quadrature phase component. In such an embodiment, the tap controller may limit both amplitude and phase corrections by the feed-forward controller 314. In such an embodiment, the gain control of the adaptive equalizer 301 may be delegated to the automatic gain controller 308 and the multiplier 310 and not to the feed-forward equalizer 314. As such, in this embodiment, it may be useful to disable or regularize the gain control function of the feed-forward equalizer 314. In some embodiments, without the tap controller 318 or similar component(s), it is conceivable that in various situations the automatic gain controller 308 and the feed-forward equalizer 314 may independently determine opposing or non-complementary gains for a signal. In such a case, the two elements may essentially fight each other over the gain. In one embodiment, the tap controller 318 may be configured to prevent or reduce such an occurrence.

In one embodiment, the tap controller 318 may be configured to reduce an amount of variation in a value of the gain tap relative to the other taps in the plurality of taps. In such an embodiment, the tap controller 318 may allow the feed-forward equalizer 314 to modify the gain tap but to a lesser extent than that of the other non-gain taps. In one embodiment, the gain tap may be limited by a power constraint, such as, for example, the magnitude-squared of all or some (e.g., a main tap and its neighbors) of the FFE 314 taps.

In one embodiment, the tap controller 318 may be configured to slowly drain some or all of the taps to a zero or another predetermined value. In one embodiment, this may counteract any tendency for the taps to drift to a high value. In one embodiment, the automatic gain controller 208 loop may be configured to leak or drain its gain slowly toward a constant. In one embodiment, this constant may be 1. In one embodiment, this may result in the automatic gain controller 208 loop tracking a relatively high frequency hum modulation, while the feed-forward equalizer (FFE) 314 taps slowly adjust their amplitudes to track the average, relatively low frequency component of the gain.

In one embodiment, the adaptive equalizer 301 may include a multiplier 320 configured to provide feedback from the automatic gain controller 308 to the feed-forward equalizer 314. In one embodiment, the gain control signal 307 or another output of the automatic gain controller 308 may be re-modulated back into an equalizer error signal input into the feed-forward equalizer 314. In one embodiment, this may be included as part of any phase error signal re-modulated back into the feed-forward equalizer 314 (such phase components are not shown but may be analogous to the amplitude components). In one embodiment, such feedback may allow the feed-forward equalizer 314 to stabilize when the equalizer adaptation step is high.

In one embodiment, the adaptive equalizer 301 may include a decision-feedback equalizer (DFE) 312 configured to filter a signal utilizing feedback of symbol decision values in addition to equalization of future symbols. In one embodiment, the output of the decision-feedback equalizer (DFE) 312 may be feedback into the slicer 302 utilizing an adder 316. In one embodiment, the adder 316 may be an intervening element such as discussed above in relation to the slicer input signal 303. In one embodiment, the decision-feedback equalizer (DFE) 312 may include a plurality of taps that vary with time.

In one embodiment, the system 300 may include a receiver 322 configured to receive a data communications signal 321. In one embodiment, the data communication signal 321 may ultimately become or be used to create the received input signal 313 input into the feed-forward equalizer 314.

Figure 4:
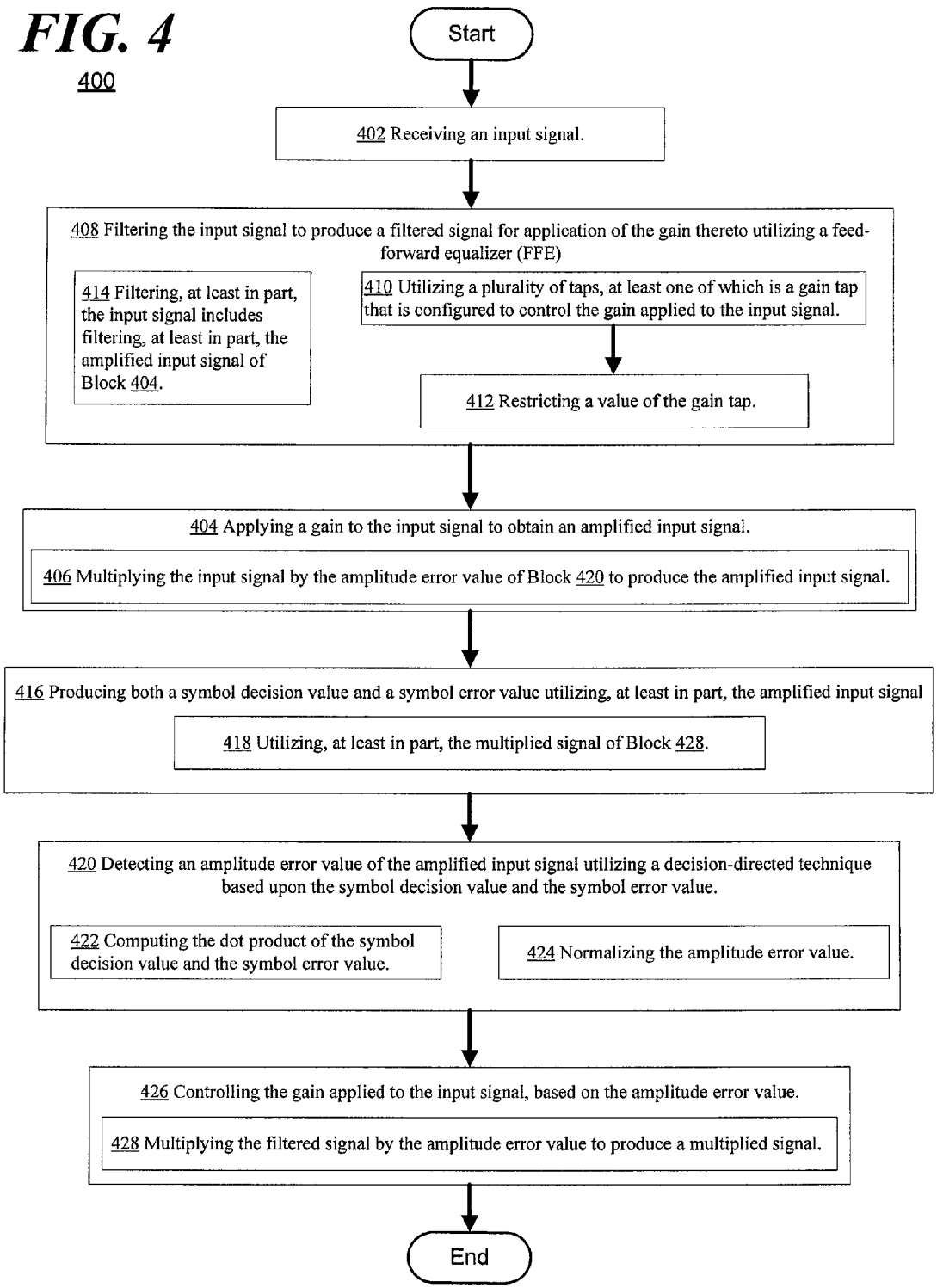
FIG. 4 is a flowchart of an embodiment of a technique to perform gain control of a signal in accordance with the disclosed subject matter.

FIG. 4 is a flowchart of an embodiment of a technique to perform gain control of a signal in accordance with the disclosed subject matter. Block 402 illustrates that, in one embodiment, a signal may be received. In one embodiment, the receiver 322 of FIG. 3 may receive the signal as described above.

Block 408 illustrates that, in one embodiment, the input signal may be filtered to produce a filtered signal(s) for application of the gain utilizing a feed-forward equalizer (FFE). In one embodiment, the feed-forward equalizer (FFE) 314 of FIG. 3 may filter the signal as described above. Block 414 illustrates that, in one embodiment, the filtering may include the filtering of the amplified input signal produced by Block 404, which may be feedback into the FFE. In one embodiment, the feedback path including multiplier 320 of FIG. 3 may facilitate the filtration of the signal as described above. In another embodiment, the feedback path including multiplier 210 of FIG. 2b may facilitate the filtration of the signal as described above.

Block 410 illustrates that, in one embodiment, the filtering may include utilizing a plurality of taps, at least one of which is a gain tap that is configured to control the gain applied to the input signal. In one embodiment, the feed-forward equalizer (FFE) 314 of FIG. 3 may include such taps as described above. Block 412 illustrates that, in one embodiment, the filtering may include restricting the value or possible values of the gain tap. In one embodiment, the tap controller 318 of FIG. 3 may perform a restriction as described above.

Block 404 illustrates that, in one embodiment, a gain may be applied to the input signal to obtain an amplified input signal. In one embodiment, such amplification may include either increasing or decreasing the amplitude of the signal. In one embodiment, the input signal may have already been filtered, as illustrated by Block 408. In an alternate embodiment, Block 404 may occur before Block 408. Block 406 illustrates that, in one embodiment, the input signal may be multiplied by an amplitude error value, such as that produced in Block 420, which may then produce the amplified input signal. In another embodiment, the feedback path including multiplier 210 of FIGS. 2a & 2b may provide this multiplication as described above.

Block 416 illustrates that, in one embodiment, the amplified input signal may be used, at least in part, to produce a symbol decision value and a symbol error value. In one embodiment, the slicer 302 of FIG. 3 may perform a symbol value production as described above. Block 418 illustrates that, in one embodiment, the multiplied signal of Block 428 may be used in the production of the symbol values. In one embodiment, the apparatus of FIGS. 1, 2a, and 2b may be embodiments of such utilization.

Block 420 illustrates that, in one embodiment, an amplitude error value of the amplified input signal may be detected utilizing a decision-directed technique based upon the symbol decision value and the symbol error value. In one embodiment, the automatic gain controller 308 or decision-directed amplitude error detector 304 of FIG. 3 may produce the amplitude error value as described above. Block 422 illustrates that, in one embodiment, an amplitude error value may be computed as dot product of the symbol decision value and the symbol error value. In one embodiment, the sign of the decision and/or the sign of the error may be used in the dot product. In one embodiment, the automatic gain controller 308 or decision-directed amplitude error detector 304 of FIG. 3 may produce the dot product as described above. Block 424 illustrates that, in one embodiment, an amplitude error value may be normalized. In one embodiment, the automatic gain controller 308 or decision-directed amplitude error detector 304 of FIG. 3 may produce the normalization as described above.

Block 426 illustrates that, in one embodiment, the gain applied to the input signal may be controlled based, at least in part, upon the amplitude error value. In another embodiment, the feedback path including multiplier 210 of FIGS. 2a & 2b may provide this multiplication as described above. Block 428 illustrates that, in one embodiment, the filtered signal may be multiplied by the amplitude error value to produce a multiplied signal or the amplified input signal. In another embodiment, the feedback path including multiplier 210 of FIG. 2a may provide this multiplication as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. The implementation may be entirely digital, entirely analog, or a combination of digital and analog.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus, comprising:
a slicer configured to produce a symbol decision value and a symbol error value utilizing a slicer input signal; and
an automatic gain controller configured to facilitate an automatic control of a gain applied to the slicer input signal by producing a gain control signal, the automatic gain controller comprising:
a decision-directed amplitude error detector configured to compute a dot product of the symbol decision value and the symbol error value and to produce an amplitude error signal based upon the dot product, and
a loop filter configured to utilize the amplitude error signal to produce the gain control signal.

2. The apparatus of claim 1, further comprising:
a feed-forward equalizer (FFE) configured to filter a received input signal to provide a filtered input signal as a part of the slicer input signal.

3. The apparatus of claim 2, wherein the FFE comprises:
a plurality of taps configured to filter the received input signal,
wherein at least one of the plurality of taps is a gain tap that is configured to control a gain applied to the received input signal, and
wherein the apparatus further comprises:
a tap controller configured to hold the gain applied to the received input signal substantially constant.

4. The apparatus of claim 2, further comprising:
a multiplier configured to multiply the filtered input signal with the gain control signal to produce the slicer input signal.

5. The apparatus of claim 2, further comprising:
a multiplier configured to multiply the received input signal with the gain control signal to be provided to the FFE.

6. The apparatus of claim 1, wherein the symbol decision value and the symbol error value are characterized as being complex signals, the symbol decision value having a first in-phase component and a first quadrature component, the symbol error value having a second in-phase component and a second quadrature component.

7. The apparatus of claim 1, wherein the decision-directed amplitude error detector is configured to normalize the amplitude error signal.

8. An apparatus, comprising:
a feed-forward equalizer (FFE) configured to filter a received input signal to provide a filtered input signal, the FFE comprising:
a plurality of taps configured to filter the received input signal,
wherein at least one of the plurality of taps is a gain tap that is configured to control a gain applied to the received input signal;
a tap controller configured to reduce an amount of variation in a value of the gain tap relative to other taps from among the plurality of taps;
a slicer configured to produce a symbol decision value and a symbol error value utilizing the filtered input signal; and
an automatic gain controller configured to facilitate an automatic control of a gain applied to the slicer input signal by producing a gain control signal, the automatic gain controller comprising:
a decision-directed amplitude error detector configured to utilize the symbol decision value and the symbol error value to produce an amplitude error signal, and
a loop filter configured to utilize the amplitude error signal to produce the gain control signal.

9. The apparatus of claim 2, wherein the FFE is configured to filter the received input signal based upon the amplitude error signal.

10. A method, comprising:
receiving an input signal;
applying a gain to the input signal to obtain an amplified input signal;
producing a symbol decision value and a symbol error value utilizing the amplified input signal;
detecting an amplitude error value of the amplified input signal utilizing a decision-directed technique based upon a dot product of the symbol decision value and the symbol error value; and
controlling the gain applied to the input signal based upon the amplitude error value.

11. The method of claim 10, further comprising:
filtering the input signal to produce a filtered signal for application of the gain thereto utilizing a feed-forward equalizer (FFE).

12. The method of claim 11, wherein filtering the input signal comprises:
utilizing a plurality of taps, at least one of which is a gain tap that is configured to control the gain applied to the input signal; and
holding the gain applied to the input signal substantially constant.

13. The method of claim 11, wherein controlling the gain applied to the input signal comprises:
multiplying the filtered signal by the amplitude error value to produce the amplified input signal,
wherein producing the symbol decision value and the symbol error value comprises:
utilizing the amplified input signal.

14. The method of claim 11, wherein applying the gain to the input signal comprises:
multiplying the input signal by the amplitude error value to produce the amplified input signal; and
filtering the amplified input signal.

15. The method of claim 10, wherein the symbol decision value and the symbol error value are characterized as being complex signals, the symbol decision value having a first in-phase component and a first quadrature component, the symbol error value having a second in-phase component and a second quadrature component.

16. The method of claim 10, wherein detecting the amplitude error value comprises:
normalizing the amplitude error value.

17. A method, comprising:
filtering an input signal to produce a filtered signal for application of a gain thereto utilizing a plurality of taps configured and arranged to form a feed-forward equalizer (FFE), at least one of the plurality of taps is a gain tap that is configured to control a gain applied to the input signal;
applying the gain to the filtered input signal to obtain an amplified input signal;
producing a symbol decision value and a symbol error utilizing the amplified input signal;
detecting an amplitude error value of the amplified input signal utilizing a decision-directed technique based upon the symbol decision value and the symbol error value;
controlling the gain applied to the input signal based upon the amplitude error value utilizing the plurality of taps, at least one of which is the gain tap that is configured to control the gain applied to the input signal; and
restricting a value of the gain tap to a limited range relative to other taps from among the plurality of taps.

18. A microchip, comprising:
a receiver configured to receive a data communications signal; and
an adaptive equalizer configured to filter the data communications signal, the adaptive equalizer comprising:
a slicer configured to produce a symbol decision value and a symbol error value utilizing a slicer input signal derived from the data communications signal, and
an automatic gain controller configured to facilitate an automatic control of a gain applied to the slicer input signal by producing a gain control signal, the automatic gain controller comprising:
a decision-directed amplitude error detector configured to compute a dot product of the symbol decision value and the symbol error value and to produce an amplitude error signal based upon the dot product, and
a loop filter configured to utilize the amplitude error signal to produce the gain control signal.

19. The microchip of claim 18, wherein the adaptive equalizer further comprises:
a feed-forward equalizer (FFE) configured to filter the data communications signal to provide a filtered input signal as a part of the slicer input signal.

20. The microchip of claim 18, wherein the symbol decision value and the symbol error value are characterized as being complex signals, the symbol decision value having a first in-phase component and a first quadrature component, the symbol error value having a second in-phase component and a second quadrature component.

* * * * *